United States Patent Office 3,115,448
Patented Dec. 24, 1963

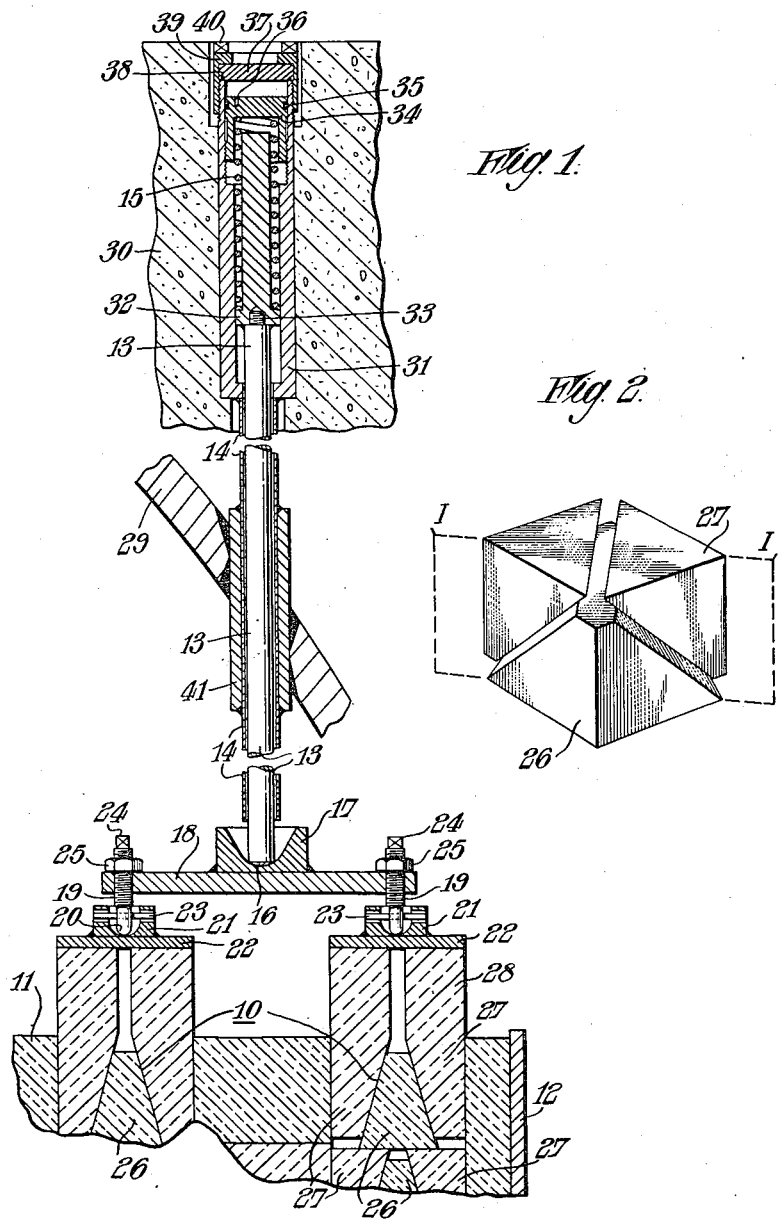

3,115,448
NUCLEAR REACTOR MODERATOR STRUCTURES
Stanley Hackney, Fearnhead, Warrington, and Peter Neil Munn, Culcheth, near Warrington, England, assignors to the United Kingdom Atomic Energy Authority, London, England
Filed July 1, 1958, Ser. No. 745,853
Claims priority, application Great Britain July 1, 1957
3 Claims. (Cl. 204—193.2)

This invention relates to nuclear reactors and it provides a radially-acting restraint device for a graphite moderator structure.

A conventional moderator and reflector structure comprises stacks of uniform right prismatic blocks positioned in layers extending in the direction of the length of the blocks, the blocks in the moderator part being suitably spaced to allow for growth under the effects of irradiation. Such a structure is not in itself stable and the instability is aggravated by the passage of a gas coolant through the structure which tends to blow it apart and by growth of the graphite under irradiation effects. Accordingly a radially-acting restraint has to be provided to keep the structure stable whilst allowing for dimensional changes in the lifetime of the reactor.

Current nuclear reactor design uses a restraint in the form of a series of garters and elastic bands, the design being made as simple and robust as possible on the basis that maintenance and adjustment is not practicable. Such designs inevitably require elastic members to be provided in a region of substantial neutron and gamma flux and the behaviour of elastic members in these conditions is not fully understood at this time. Similarly, the behaviour of the graphite structure itself under condition of prolonged irradiation is not fully established and there are even reasons to believe that shrinkage of the graphite may eventually occur.

According to the present invention a radially-acting restraint device for a graphite moderator structure comprises a series of wedges arranged to impose radially-acting restraint forces between a graphite moderator structure and a containing vessel, and means for applying forces to the wedges comprising a thrust rod contained within a tube and loaded by a spring in the tube, the tube and rod being of a length to allow the spring to operate in a zone protected by shielding from radiations from the reactor and accessible from outside said shielding.

The invention will now be described with reference to the accompanying drawings wherein FIG. 1 is a sectional view and FIG. 2 is a perspective view in which the plane of the section of FIG. 1 is indicated by the line I.

In FIG. 1 a series of wedges 10 is arranged to impose radially-acting restraint forces between a graphite moderator structure 11 and its containing vessel 12. Forces are applied to the wedges 10 by a thrust rod 13 contained within a guide tube 14 and loaded by a spring 15. The rod 13 and tube 14 pass through a reactor pressure vessel 29 and radiation shielding 30.

The thrust rod 13 has a rounded end 16 and bears on a bearing cap 17 mounted on a thrust plate 18. The thrust plate 18 carries screw-threaded adjusting pins 19 with square ends 24 and rounded ends 20. The rounded ends 20 bear on bearing caps 21 mounted on plates 22 on the wedges 10 and are held in the caps 21 by pins 23.

Locknuts 25 are provided above the thrust plate 18. The wedges 10 (shown also in FIG. 2) comprise, in effect, cuboids divided into three parts by two cuts each starting along the same diagonal of the top face of the cuboid and finishing respectively near the corners lying at the ends of a transverse diagonal of the bottom face of the cuboid, the knife edges of the three parts being removed. This arrangement provides a wedge shaped piece 26 acting against two identical members 27, the top two members 27 having extensions 28 on which the plates 22 are fixed. Each wedge shaped piece 26 rests on the two members 27 below it so that the load is transmitted through pieces 26 and members 27 alternately and as the load on the pieces 26 becomes heavier the angle of the cuts dividing the cuboid is made more acute. A ring of wedge assemblies is provided around each layer of graphite blocks.

The thrust rod 13 and guide rod 14 pass through the reactor pressure vessel 29 and radiation shielding 30. A strengthening sleeve 41 is welded to the guide rod 14 and to the pressure vessel 29. The spring 15 loading the rod 13 is housed in a spring housing 31 located in the shielding 30 so as to be well shielded from the reactor. The housing 31 is welded to the guide tube 14.

The spring operates through a flanged plug 32 screwed and welded on an extension 33 on the rod 13 and is adjusted by means of a spring compression plug 34 screwed into the housing 31 and sealed by a sealing ring 35. A hole 36 is provided for rotating the plug 34 with a key fitting in the hole. A cap 37 with a sealing ring 38 is clamped over the housing 31 by a ring 39 with castellations 40.

In the assembly of the restraint device the screws 19 are adjusted to bring the thrust plate 18 level and the screws are then secured with pins 23 and lock-nuts 25. The rod 13 and its spring assembly is made up and the compression plug 34 adjusted to give a predetermined deflection to the spring 15. The cap 37 is then clamped in position with the ring 39 to seal the tube 14. Thus restraint is exercised on the moderator structure 11 through the springs 15, plug 32, rod 13, bearing cap 17, thrust plate 18, pins 19, caps 21, plates 22 and wedges 10. In the wedges 10 the members 27 take up positions relative to the wedge shaped pieces 26 depending on the load applied by compression of the spring 15 and as growth takes place in the moderator structure so slip occurs on the faces of the wedges to increase the compression of the spring 15. From time to time the compression may be decreased by unscrewing the cap 34.

In addition to the restraint applied whilst accommodating Wigner growth the restraint device described above also accommodates the thermal growths occurring during warming up of the reactor when the containing vessel 12 expands more than the graphite moderator structure which would normally cause substantial reduction of the initial restraining forces, or, in the absence of strong initial restraint forces, the removal of restraint altogether.

We claim:
1. In a nuclear reactor having a moderator structure within a containing vessel, means for restraining movement of the moderator structure in the direction radial of the containing vessel, said restraining means comprising a series of wedges disposed in the moderator structure and displaceable in a direction normal to said radial direction to accommodate moderator structure expansion in said radial direction, and means for engaging said wedges to control the extent of displacement thereof in said direction normal to said radial direction and thus accommodate radial expansion of said moderator structure, said means engaging said wedges including wedge bearing means applying force on the wedges in a direction normal to said radial direction, means for loading said wedge bearing means, and means for adjusting said loading means.

2. A nuclear reactor according to claim 1 wherein the series of wedges includes a cuboid divided into three parts by two cuts each starting along the same diagonal of the top face of the cuboid and finishing respectively near the corners lying at the ends of a transverse diagonal of the bottom face of the cuboid, the knife edges of the three parts being removed.

3. A nuclear reactor according to claim 1 wherein the moderator structure comprises stacks of graphite blocks lying along a radious of the containing vessel and the wedges are disposed between stacks of graphite blocks, and said wedge bearing means includes means bearing on two sets of wedges spaced from one another by a stack of graphite blocks, and thrust means in adjustable engagement with said last named means.

References Cited in the file of this patent

UNITED STATES PATENTS

| | | |
|---|---|---|
| 1,266,745 | Wundrack | May 21, 1918 |
| 1,738,527 | Dobie | Aug. 18, 1924 |
| 1,896,669 | Frisch et al. | Feb. 7, 1933 |
| 2,838,451 | Long et al. | June 10, 1958 |
| 2,852,457 | Long et al. | Sept. 16, 1958 |
| 2,853,440 | Hughes | Sept. 23, 1958 |
| 2,970,097 | Correc | Jan. 31, 1961 |

FOREIGN PATENTS

| | | |
|---|---|---|
| 785,928 | Great Britain | Nov. 6, 1957 |